United States Patent [19]
Huignard et al.

[11] Patent Number: 5,394,412
[45] Date of Patent: Feb. 28, 1995

[54] POWER LASER WITH DEFLECTION

[75] Inventors: Jean-Pierre Huignard, Paris; Jean-Luc Ayrai, Antony; Claude Puech, Ballainviluers, all of France

[73] Assignee: Thomson-CSF, Puteaux, France

[21] Appl. No.: 50,256

[22] PCT Filed: Sep. 22, 1992

[86] PCT No.: PCT/FR92/00878

§ 371 Date: May 12, 1993

§ 102(e) Date: May 12, 1993

[87] PCT Pub. No.: WO93/06644

PCT Pub. Date: Apr. 1, 1993

[30] Foreign Application Priority Data

Sep. 27, 1991 [FR] France ................. 91 11912

[51] Int. Cl.⁶ .................... H01S 3/10; H01S 3/14
[52] U.S. Cl. ............................ 372/9; 372/21; 372/27; 372/39; 372/40; 372/106; 372/109; 359/333; 359/334; 359/342; 359/343; 359/349
[58] Field of Search ........... 372/3, 7, 9, 13, 21, 372/22, 24, 23, 27, 29, 39, 40, 41, 92, 97, 99, 101, 106, 109; 359/333, 334, 342, 343, 346, 349

[56] References Cited

U.S. PATENT DOCUMENTS

| | | | |
|---|---|---|---|
| 4,286,238 | 8/1981 | Ursenbach | 333/206 |
| 4,286,838 | 9/1981 | Huignard et al. | 385/14 X |
| 4,306,763 | 12/1981 | Huignard | 250/552 X |
| 4,309,667 | 1/1982 | Di Forte et al. | 385/14 X |
| 4,451,151 | 5/1984 | Huignard | 356/345 |
| 4,451,412 | 5/1984 | Loiseaux et al. | 264/1.3 |
| 4,505,536 | 3/1985 | Huignard et al. | 372/21 X |
| 4,514,038 | 4/1985 | Pichon et al. | 364/822 |
| 4,576,434 | 3/1986 | Huignard et al. | 372/21 X |
| 4,586,779 | 5/1986 | Huignard et al. | 365/216 |
| 4,639,091 | 1/1987 | Huignard et al. | 372/21 X |
| 4,818,052 | 4/1989 | Le Pesant et al. | 385/16 X |
| 4,836,629 | 6/1989 | Huignard et al. | 372/21 X |
| 4,847,521 | 7/1989 | Huignard et al. | 372/21 X |
| 4,864,312 | 9/1989 | Huignard et al. | 342/375 |
| 4,877,312 | 10/1989 | Huignard et al. | 372/21 X |
| 5,034,627 | 7/1991 | Ayral et al. | 372/21 X |
| 5,038,359 | 8/1991 | Pepper et al. | 372/21 X |
| 5,045,719 | 9/1991 | Ayral et al. | 372/21 X |
| 5,050,175 | 9/1991 | Ayral et al. | 372/21 |
| 5,072,135 | 12/1991 | Huignard et al. | 359/327 |
| 5,075,573 | 12/1991 | Huignard et al. | 359/326 |
| 5,086,433 | 2/1992 | Pocholle et al. | 372/72 |
| 5,088,096 | 2/1992 | Pocholle et al. | 372/20 |
| 5,097,478 | 3/1992 | Verdiell et al. | 372/94 |
| 5,105,428 | 4/1992 | Pocholle et al. | 372/24 |
| 5,121,400 | 6/1992 | Verdiell et al. | 372/32 |
| 5,123,025 | 6/1992 | Papuchon et al. | 372/72 |
| 5,150,241 | 9/1992 | Joffre et al. | 359/89 |
| 5,173,910 | 12/1992 | Pocholle et al. | 372/22 |

FOREIGN PATENT DOCUMENTS

| | | | |
|---|---|---|---|
| 0390662 | 10/1990 | European Pat. Off. | 372/21 X |
| WO90/10889 | 9/1990 | WIPO | 372/21 X |
| WO90/13056 | 11/1990 | WIPO | 372/21 X |

OTHER PUBLICATIONS

Optics Communications, vol. 52, No. 2, Nov. 15, 1984, Amsterdam, NL, M. M. Devane: "Temporal Investigation of Phase Conjunction, with Enhancement, in Magnesium Tetraphenyl Prophyrin (MgTPP)", pp. 136–140.

*Primary Examiner*—Brian Healy
*Attorney, Agent, or Firm*—Oblon, Spivak, McClelland, Maier & Neustadt

[57] ABSTRACT

Power laser includes a non-linear medium (NL1) within which a first beam of fixed direction (I1) and a second beam of orientable direction interfere with each other, an amplifying medium (2) placed along the direction of the first beam for amplifying the received light for transmitting an amplified beam towards the non-linear medium (NL1), which retransmits this bean in the direction of the second beam, and therefore in an orientable direction.

17 Claims, 2 Drawing Sheets

POWER LASER WITH DEFLECTION

BACKGROUND OF THE INVENTION

1. Field of the Invention

The invention relates to a power laser with deflection.

2. Discussion of the Background

Already known in the art are lasers which include the function of controlling the angular orientation of the emitted optical beam. However, lasers of this type are of low power.

SUMMARY OF THE INVENTION

3. The invention relates to a power laser including in its structure an angular control of the emission.

The treatment of power laser beams by non-linear optical means makes it possible to envisage a significant improvement in the spatial quality of the emitted beams, and to introduce new functions of angular control or of phase synchronisation of oscillators. The subject of the invention lies in a laser structure exploiting non-linear media with a photo-induced variation of index in order to produce the two following properties simultaneously:

generation of diffraction-limited beams,
large angular field deflection.

The structure of the laser presented is of the oscillator/amplifier type and it uses non-linear materials for the dynamic inscription of index gratings and the generation of conjugate waves. Furthermore, the direction of the high energy beam emitted by the laser results from the acousto-optic deflection of a low energy beam.

The invention therefore relates to a power laser with direction, characterised in that it comprises at least:

a medium made of non-linear material illuminated by a first beam of fixed direction and a second beam of variable deflection;

an amplifying medium placed along the direction of the first beam receiving at least part of the first and second beams, amplifying them and retransmitting an amplified beam towards the medium made of non-linear material which reflects the amplified beam in the direction of the second beam;

a first beam-splitting device placed in the path of the amplified beam.

BRIEF DESCRIPTION OF THE DRAWINGS

The various objects and characteristics of the invention will appear more clearly in the description which will follow and in the appended figures which represent.

DETAILED DESCRIPTION OF THE PREFERRED EMBODIMENTS

Figure 1:
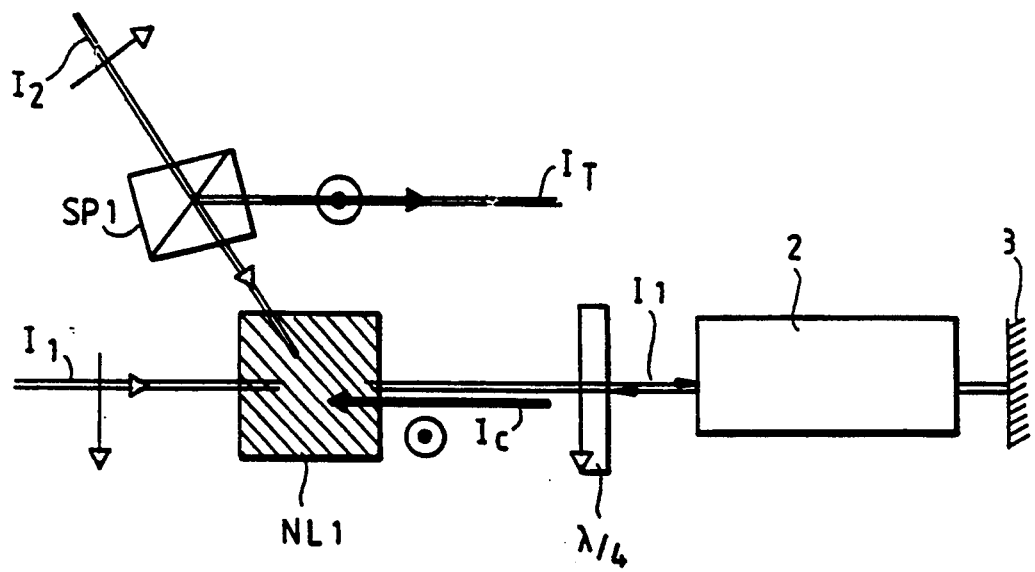
FIG. 1, a general embodiment of the structure according to the invention.

To begin with, therefore, a general description of the device of the invention based on FIG. 1 will be given.

Two polarised beams I1 and I2 are transmitted to a medium made of a non-linear material NL1. The beam I2 may be controlled in its angular direction by means not represented. The two beams I1 and I2 interfere in the non-linear medium and create an index grating which causes the transmission of at least part of the light towards an optical amplifier 2. The light makes at least one outward and return journey in the amplifier 2 as a result of reflection at a reflecting device 3.

An amplified beam Ic is sent back towards the non-linear medium NL1.

The direction of polarisation of this beam Ic is rotated through 90° with respect to the direction of polarisation of the beams I1 and I2 because of the presence of the quarter-wave plate λ/4. The amplified beam Ic is reflected at least in large part by the non-linear medium, along the direction of the beam I2. A polarisation splitter SP then makes it possible to extract the amplified beam and to emit a beam IT.

Figure 2:
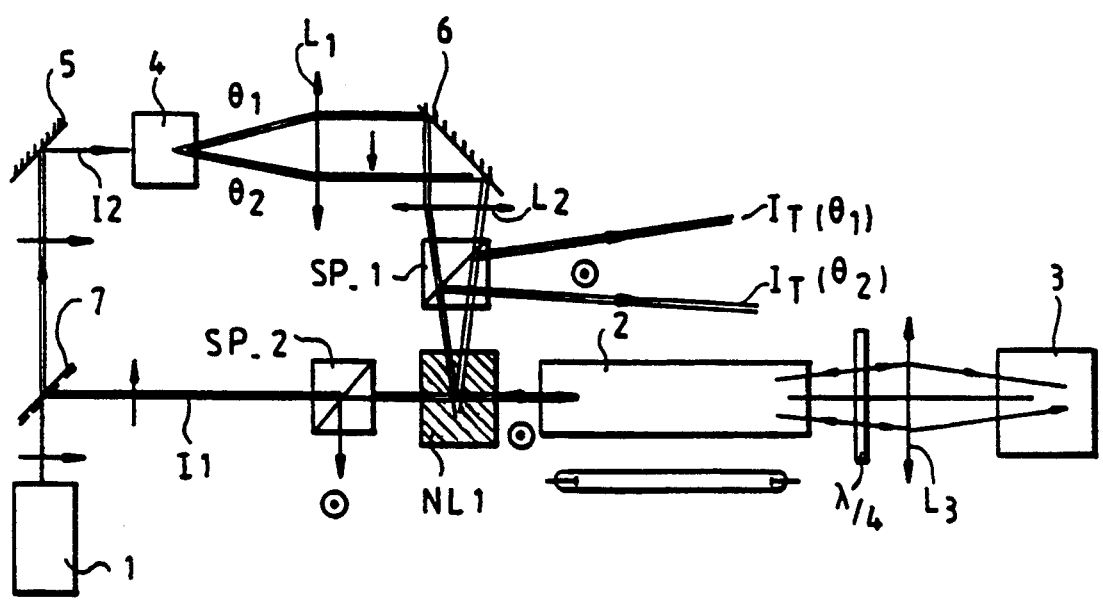
FIG. 2, a detailed embodiment of the structure of the invention.

The device of the invention comprises, as shown in FIG. 2, the following elements:

a longitudinal monomode oscillator laser 1 functioning in triggered mode;

an amplifier 2 operating as a double passage amplifier after reflection;

a conjugate mirror or a self-pumped phase conjugate mirror 3 making it possible to reflect the wave transmitted by the amplifier 2;

a non-linear medium NL1 which is used as the medium for the dynamic inscription of photo-induced gratings having a high diffraction efficiency and whose function will be described in detail hereinafter;

a beam deflector 4 having the desired spatial resolution over a given angular sweep;

a beam splitter 7 making it possible to split the beam emitted by the oscillator into a beam I1 and a beam I2;

focusing devices L1, L2, L3;

reflecting mirrors 5 and 6;

a quarter-wave plate λ/4 placed between the amplifier 2 and the phase conjugate mirror 3.

The operation of this laser structure, which includes a function of scanning a large field, is as follows: the beam emerging from the oscillator 1 is split into two beams I1–I2, one of which undergoes a 1D or 2D angular deflection (acousto-optic deflection unit, for example, in the beam deflector 4). The optical system L1–L2 images the centre of rotation of the beam onto the non-linear medium NL1 illuminated by the interference figure of the two beams I1 and I2. The chosen interaction is such that there is no redistribution of energy between the two beams I1 and I2 emerging from the non-linear material (Material with local response: the photo-induced variation in index is in phase with the spatial illumination of the interference figure). The beam I1 undergoes a reflection at the conjugate mirror. There is hence a double passage of the beam I1 through the high-gain laser amplifier 2. Under these conditions, there is available at the output of the amplifier 2 a power beam $I_c$ whose phase distortions are totally corrected and whose intensity is:

$$I_c: I_1 \times R_c \exp 2\gamma L$$

with $R_c$: reflection coefficient of the conjugate mirror,
L: length of the rod,
γ: laser gain coefficient.

This beam $I_c$ is incident on the non-linear medium NL1 where it undergoes diffraction by the index grating photo-induced by the beams $I_1$-$I_2$. From this, there results a high energy transmitted beam $I_T$ whose direction is that of the beam $I_2$ emerging from the deflector 4. In this four-wave interaction, all the beams may be considered to be at the same frequency since the Brillouin shift (of the order of GHz) remains small compared with the optical frequency. The beam $I_c$ rescans the grating at Bragg incidence, leading to the optimum diffraction efficiency:

$$I_T = I_1 \times \eta R_c \exp 2\gamma L$$

with $$\eta = \eta \sin^2 \pi d \Delta n / \lambda.$$

d, $\Delta n$ being respectively the thickness and the index modulation of the medium NL1. In this operation of rescanning the photo-induced grating, an attempt will be made to obtain an efficiency $\eta$ close to unity corresponding to the condition $d\Delta n \simeq \lambda/2$.

The mode of operation of the laser system including the function of deflection of the grating is therefore based on the following three operational features:

a) choice of a direction of deflection of the beam $I_2$ and interference of the two waves in the medium NL1;

b) double passage amplification and phase conjugation of the beam $I_1$;

c) obtaining the power beam $I_T$ emitted in the direction of $I_2$ by the efficient diffraction of $I_c$ at the photo-induced grating.

As indicated in FIG. 2, the two beams $I_1$ and $I_2$ have the same polarisation, for example parallel to the plane of the figure. A $\lambda/4$ plate interposed between the laser amplifier 2 and the focusing lens L3 generates, after a double passage, a polarisation rotated through 90°. This horizontal polarisation (perpendicular to the incident polarisation) is used to scan the photo-induced grating and is reflected by the polarisation splitter SP-1. Similarly, a polarisation splitter SP-2 interposed in the beam $I_1$ prevents the return of a small part of the non-diffracted light in the direction of the oscillator.

Pulses delivered by the oscillator 1 triggered by conventional means (electro-optic or acousto-optic cells) are of the order of 10 to 20 ns. The inscription of the grating in NL1 must be carried out with a time constant of the order of 1 to 2 ns, a constant comparable to the establishment of the Brillouin mirror 3. Since the dimension L of the amplifier remains limited (L+3 Brillouin cell 3>30 cm), the non-linear interactions of inscription and scanning of the gratings are carried out almost simultaneously (delay of the order of 2 ns for the scanning of NL-1). Since the rate at which the pulses are delivered by such lasers are from 10 to several hundred Hz, the relaxation times of the photo-induced gratings of the order of several microseconds are wholly compatible with the envisaged application. Similarly, the time constant of the deflector 4 of a few microseconds in acousto-optic technology is entirely suitable for the dynamic positioning of the beam (single pulse or a series of pulses) in any angular direction.

The choice of the non-linear medium NL1 must be such that, apart from the response time of the medium, the following criteria are satisfied:

The amplitude of the variation in index $\Delta n$ for a given power density emerging from the oscillator. The power density incident on the material may be adjusted by means of the diameter of the beams $I_1$-$I_2$.

$$\Delta n = n_2 \times (I_1 + I_2) W/cm^2$$

with $n_2$ = non-linear coefficient.

Low absorption in order to obtain a diffraction efficiency close to 100% for the beam $I_c$ in the direction $I_2$.

Acceptance angle convenient for the inscription of the variable-pitch grating due to the interference of $I_1$ and $I_2$ (10° to 20° for example).

The possible non-linear mechanisms satisfying these criteria are:

the optical Kerr effects ($CS_2$—liquid crystals, organic crystals, etc), the photo-refractive effects (SBN, GaAs, BSO, etc), saturated absorption (dyes, semiconductors, etc), laser materials (YAG, ruby, glass, Nd, etc).

As an example, a numerical application will be given below which corresponds to the use of the optical Kerr effect in $CS_2$ (reference material $n_2 = 2 \times 10^{-18}$ $cm^2 W^{-1}$). This material has the advantage of possessing the properties required for the manifestation of the effects.

Figure 3:
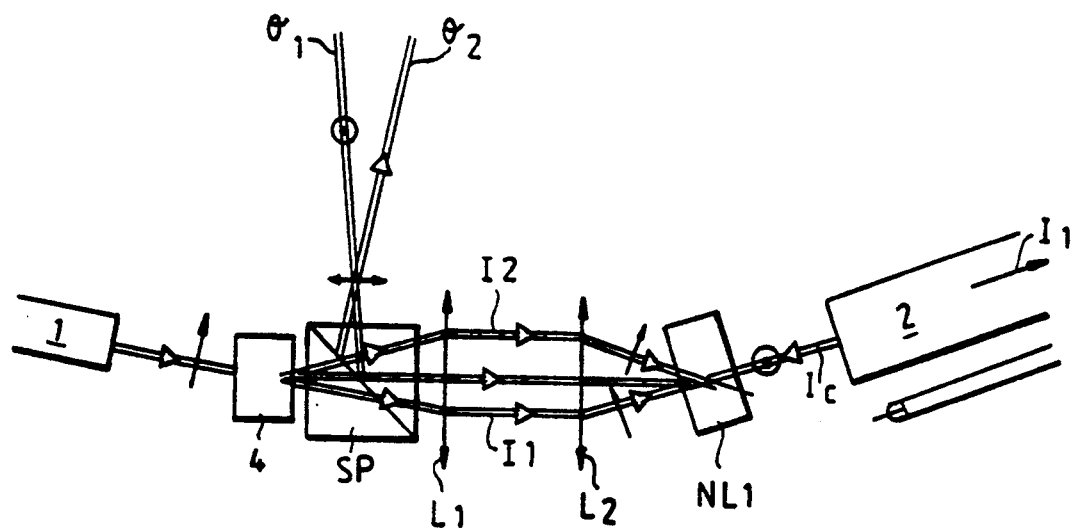
FIG. 3, a variant embodiment of the device of the invention.

The laser structure of FIG. 3 represents a more compact variant embodiment of the invention in the most common case in which the deflector 4 is of the acousto-optic type. The part not diffracted by the cell constitutes the beam $I_1$. The diffracted part is the beam $I_2$ whose orientation is chosen by the deflector. The polarisation splitter SP makes it possible to extract the power beam during its return from the amplifier. The matching of the beam at the output of the deflector 4 to the diameter of the amplifier rod may, if necessary, be achieved by means of an afocal optical system.

The non-linear medium NL1 is, here again, situated between the splitter SP and the amplifier 2, which enables the beam $I_c$ to be retransmitted along the direction of the beam $I_2$.

Figure 4:
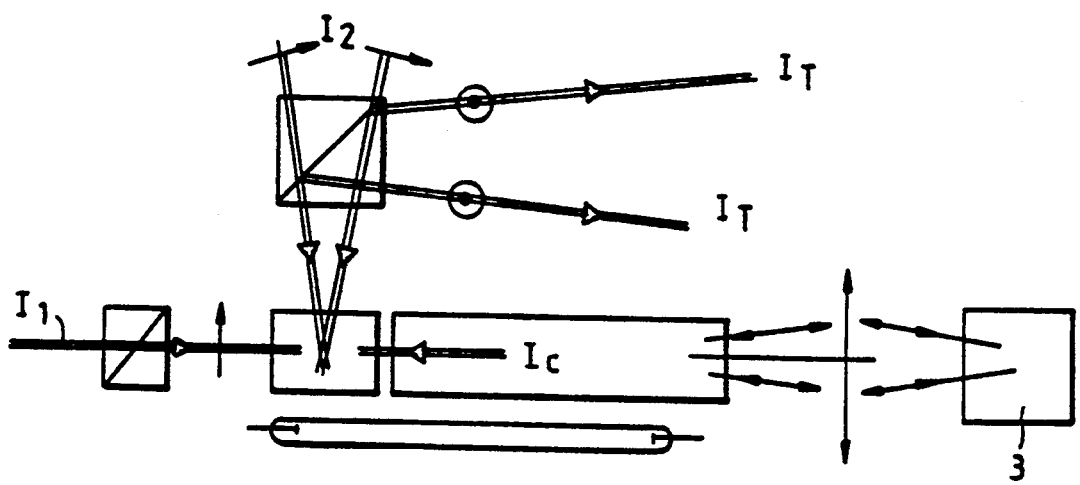
FIG. 4, another variant embodiment of the device of the invention.

The laser structure of FIG. 4 uses as a non-linear material NL1 the same material as the laser medium. This approach has several advantages, indicated as follows:

the non-linear medium NL1 is identical to that used for the amplification of the beams by stimulated emission: it is unnecessary to look for an additional material having all the required features;

the non-linear mechanism responsible for the generation of the output beam $I_T$ is the saturation of the gain of the laser amplifier;

the function of treating the beam (in the present case, angular deflection) can be included in the function of amplification by stimulated emission. In FIG. 4, the two functions—photo-induced grating NL1 and double passage amplification—are spatially separate but produced in the same material held in a population inversion by flash (or diode) pumping.

As an illustration, an example is given below in which the various constituent elements are as follows:

Monomode oscillator: Nd:YAG laser, diode pumped 10 ns-40 mJ pulse.

2D-$TeO_2$ acousto-optic deflection unit Number of points: 500×500 Access time: 5 $\mu s$ Efficiency: 50% Angular excursion: 10° ($\phi_d = 2$ mm)

Phase conjugate mirror: Brillouin cell: $CH_4 = 100$ atm
Reflectivity of the wave: 70%

Double passage laser amplifier: Diameter $\phi_L$: 7 mm
Laser gain: 0.15 cm$^{-1}$ Length L: 10 cm NL-1 medium: Kerr effect $CS_2$ $I_1 + I_2 \simeq 30$ mJ — $\phi \simeq 1$ mm $n = n_0 + 4.2 \times 10^{18} \times I$ (W m$^{-2}$)

Power density incident on the medium: $I = 10^8$ W cm$^{-2}$; $10^{12}$ W m$^{-2}$ Photo-induced variation of index $\Delta n = 1.26 \cdot 10^{-5}$ Thickness of the cell to obtain 100% efficiency on the wave $I_C$ $d \simeq \lambda/2\Delta n = 40$ mm Energy emitted by the laser $I_T = 0.7 \times 30 \times 10^{-3} \times \exp 0.3 \times 10$ $I_p \simeq 600$ mJ.

The device of the invention has the following advantages:

The beam undergoing amplification and phase conjugation remains fixed. Under these conditions, the whole volume of the amplifying medium is used. By comparison, in some known microscanning techniques the beam occupies a limited part of the active volume (typically 50%).

The proposed laser structure makes it possible to produce a high energy source having a very good spatial beam quality with a rapid control of the direction of emission (typically a few microseconds).

The structure uses a non-linear medium NL1 whose only function is to ensure the dynamic diffraction of the conjugate beam in a given angular field.

The structure is compatible with the use of several amplifying stages.

The above description has been given solely by way of example. Other variants may be envisaged without departing from the scope of the invention. In particular, the embodiments of the various elements of the device according to the invention have been provided solely in order to illustrate the description.

We claim:

1. A power laser with deflection characterized in that it comprises at least:
   a medium made of a non-linear material (NL1) illuminated by a first beam (I1) of fixed direction and a second beam (I2) of variable direction;
   an amplifying medium (2) placed along the direction of the first beam (I1) receiving as an output from the medium made of a non-linear material, an output beam consisting of at least part of the first and second beams that is propagating along the direction of the first beam, amplifying the output beam by light amplification by stimulated emission of radiation, and retransmitting an amplified beam (Ic) back towards the medium made of non-linear material (NL1) which reflects the amplified beam (IC) back along the direction of the second beam (I2); and
   a first beam splitting device (SP1) placed in the path of the amplified beam (Ic).

2. Laser according to claim 1, characterized in that it comprises a controllable optical deflector (4) supplying the second beam of variable direction.

3. Laser according to claim 2, characterized in that it comprises an optical source (1) and a second beam splitter (7) receiving a beam emitted by the optical source and supplying in exchange the first and second beam, the deflector being placed in the path of the second beam.

4. Laser according to claim 1, characterized in that:
   the first and second beam are polarised in the same direction of polarization;
   it comprises a quarter-wave plate placed on the output side of the medium made of non-linear material (NL1);
   the first beam splitter (SP1) is a polarisation splitter.

5. Laser according to claim 1, characterized in that it comprises a phase conjugate mirror (3) associated with the amplifier, (2) and reflecting towards the amplifier the first and second beams.

6. Laser according to claim 2, characterized in that the deflector (4) comprises an acousto-optic deflection device.

7. Laser according to claim 1, characterized in that the non-linear medium (NL1) comprises a Kerr effect device or a photo-refractive crystal or a laser material.

8. Laser according to claim 7, characterized in that the non-linear medium (NL1) and the amplifier (2) are formed from in the same single block of material.

9. Laser according to claim 5, characterized in that the phase conjugate mirror (3) comprises a Brillouin cell.

10. A high power laser with an output beam deflection capability, comprising:
    a non-linear medium made of an optically non-linear material;
    means for illuminating the non-linear medium with a first laser beam such that the first laser beam propagates towards the non-linear medium along a first path that is fixed relative to the non-linear medium;
    means for illuminating the optically non-linear medium with a second laser beam such that the second laser beam propagates towards the non-linear medium along a second path;
    means for varying the second path along which the second beam propagates towards the non-linear medium;
    wherein the application of the first and second laser beams to the non-linear medium generates a third laser beam propagating along a third path that is along an extension of the first path of the first beam;
    an optical amplifier disposed along the third path for amplifying the third laser beam, said optical amplifier comprising means for amplifying light by stimulated emission of radiation;
    means for retro-reflecting the amplified third laser beam so that it propagates back into the non-linear medium;
    wherein a fourth beam is generated in the non-linear medium which propagates back along the path of the second beam.

11. A laser according to claim 10, wherein the first and fourth beams are polarized and further comprising:
    means for providing a polarization to the fourth beam that is perpendicular to the polarization of the second beam; and
    a polarizing beam splitter disposed along the second path such that the second beam is not reflected by the polarizing beam splitter but the fourth beam is reflected by the polarizing beam splitter.

12. A laser according to claim 11, wherein the means for providing a polarization to the fourth beam comprises a plate that is disposed along the third path that rotates the polarization of the third beam and of the amplified third beam such that the polarization of the subsequently generated fourth beam is perpendicular to the polarization of the second beam.

13. A laser according to claim 10, wherein the means for varying comprises and optical deflector which deflects the second beam.

14. A laser according to claim 10, further comprising: means for reflecting the fourth beam while transmitting the second beam.

15. A laser according to claim 14, wherein said means for reflecting the fourth beam comprises a polarizing beam splitter.

16. A power laser with deflection, comprising:
a non-linear medium made of a non-linear material that is illuminated by a first beam along a fixed direction and by a second beam along a direction that is variable, the non-linear medium outputting a third beam along the first direction;
an amplifying medium along the direction of the path of the first beam but separated from the first beam by the nonlinear medium, the amplifying medium receiving the third beam, amplifying the third beam, and retransmitting the amplified third beam back towards the non-linear medium, wherein the third beam is reflected/refracted so that it travels along the path of the second beam but in the opposite direction relative to the second beam;
a first beam splitting device (SP1) placed in the path of the second beam for reflecting the amplified third beam;
a controllable optical deflector for varying the direction of the second beam;
an optical source providing an optical beam for supplying the first and second optical beams;
a second beam splitting device for forming the first and second beams from the optical beam; and
wherein the controllable optical deflector is in the path of the second optical beam.

17. A power laser with deflection, comprising:
a non-linear medium made of a non-linear material that is illuminated by a first beam along a fixed direction and by a second beam along a direction that is variable, the non-linear medium outputting a third beam along the first direction;
an amplifying medium along the direction of the path of the first beam but separated from the first beam by the non-linear medium, the amplifying medium receiving the third beam, amplifying the third beam, and retransmitting the amplified third beam back towards the non-linear medium, wherein the third beam is reflected/refracted so that it travels along the path of the second beam but in the opposite direction relative to the second beam;
a first polarizing beam splitting device (SP1) placed in the path of the second beam for reflecting the amplified third beam;
a quarter wave plate between the non-linear medium and the amplifying medium and in the path of the third beam; and
wherein the first and second beams are polarized.

* * * * *

UNITED STATES PATENT AND TRADEMARK OFFICE
CERTIFICATE OF CORRECTION

PATENT NO. : 5,394,412
DATED : February 28, 1995
INVENTOR(S) : Jean-Pierre HUIGNARD, et al.

It is certified that error appears in the above-indentified patent and that said Letters Patent is hereby corrected as shown below:

On the title page, Item [75], the second inventor's name should read:

--Jean-Luc Ayral--

Also on the title page, Item [87], the PCT Publishing Number should read:

--WO93/06641--

Signed and Sealed this

Sixth Day of June, 1995

Attest:

BRUCE LEHMAN

Attesting Officer

Commissioner of Patents and Trademarks